(12) United States Patent  (10) Patent No.: US 6,688,870 B2
Shibata et al.  (45) Date of Patent: Feb. 10, 2004

(54) OPTICAL FIBER COATING DEVICE

(75) Inventors: Toshio Shibata, Tokyo (JP); Hideki Watanabe, Tokyo (JP); Hidekazu Kojima, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 284 days.

(21) Appl. No.: 09/938,469

(22) Filed: Aug. 21, 2001

(65) Prior Publication Data

US 2002/0066407 A1 Jun. 6, 2002

(30) Foreign Application Priority Data

Aug. 23, 2000 (JP) ........................ 2000-252774
Aug. 25, 2000 (JP) ........................ 2000-255275

(51) Int. Cl.[7] .............................................. B29C 45/14
(52) U.S. Cl. ................. 425/117; 264/1.25; 264/1.27; 425/169; 425/173; 425/174.4
(58) Field of Search ................ 425/116, 169, 425/173, 174.4, 117; 264/263, 496, 1.25, 1.27

(56) References Cited

U.S. PATENT DOCUMENTS

| | | | | |
|---|---|---|---|---|
| 3,528,132 A | * | 9/1970 | Greenberg et al. | 425/156 |
| 3,682,580 A | * | 8/1972 | Greenberg et al. | 425/174.4 |
| 4,102,717 A | * | 7/1978 | Hensel | 156/64 |
| 4,410,561 A | * | 10/1983 | Hart, Jr. | 427/513 |
| 4,525,312 A | * | 6/1985 | Jones | 264/1.25 |
| 4,548,669 A | * | 10/1985 | Steinmann et al. | 156/358 |
| 4,627,942 A | * | 12/1986 | Gagen et al. | 264/1.25 |
| 4,662,307 A | * | 5/1987 | Amos et al. | 118/50.1 |
| 4,662,962 A | * | 5/1987 | Malavieille | 156/158 |
| 4,728,169 A | * | 3/1988 | Campbell et al. | 385/32 |
| 4,976,596 A | * | 12/1990 | Darsey et al. | 425/117 |
| 5,093,048 A | * | 3/1992 | Kagan | 264/1.25 |
| 5,132,057 A | * | 7/1992 | Tomisaka et al. | 264/1.27 |

FOREIGN PATENT DOCUMENTS

| | | | | |
|---|---|---|---|---|
| JP | 06144884 A | * | 5/1994 | C03C/25/02 |
| JP | 06148452 A | * | 5/1994 | G02B/6/255 |
| WO | WO177730 | | 10/2001 | |

OTHER PUBLICATIONS

U.S. patent application Ser. No. 09/886,411, Kojima, et al., filed Jun. 20, 2001.

* cited by examiner

Primary Examiner—Robert Davis
(74) Attorney, Agent, or Firm—Knobbe Martens Olson & Bear LLP

(57) ABSTRACT

An optical fiber coating device that recoats a coating removed portion of an optical fiber with light-curing resin has an observation window through which a mold inside of a shielding lid that covers the mold can be confirmed in a state where the shielding lid remains closed. There is provided an open/close lid that can open/close the observation window. An optical shielding guard plate is provided around the observation window. A filter that cuts off the external light having a specific wavelength is provided on the observation window. There is provided a photo sensor that can detect the amount of light of a light source that irradiates a light onto the light-curing resin, and the amount of light can be automatically adjusted on the basis of the detected result of the photo sensor. An alarm that urges to exchange the light source is raised on the basis of the detected result of the photo sensor. There is provided a TV camera that can capture the interior of the mold and other portions to be observed. There is provided a mirror that projects a portion that cannot be directly observed among the portions to be observed.

24 Claims, 15 Drawing Sheets

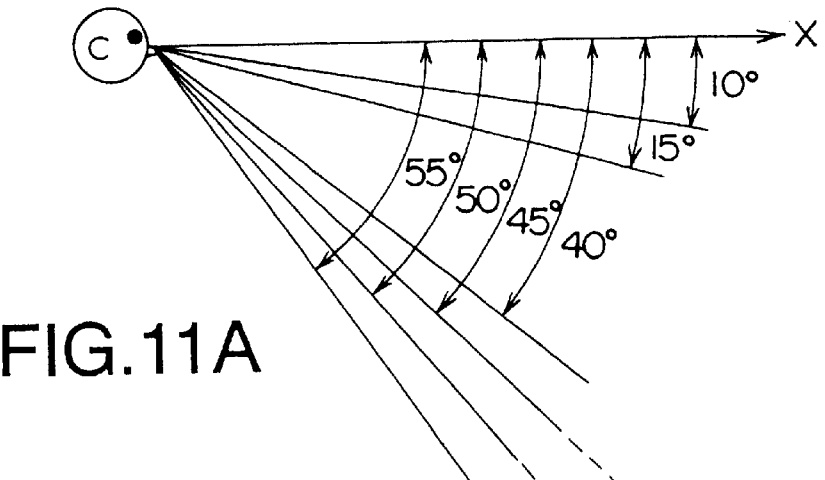
FIG.11A
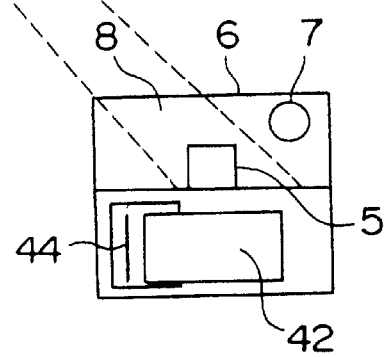
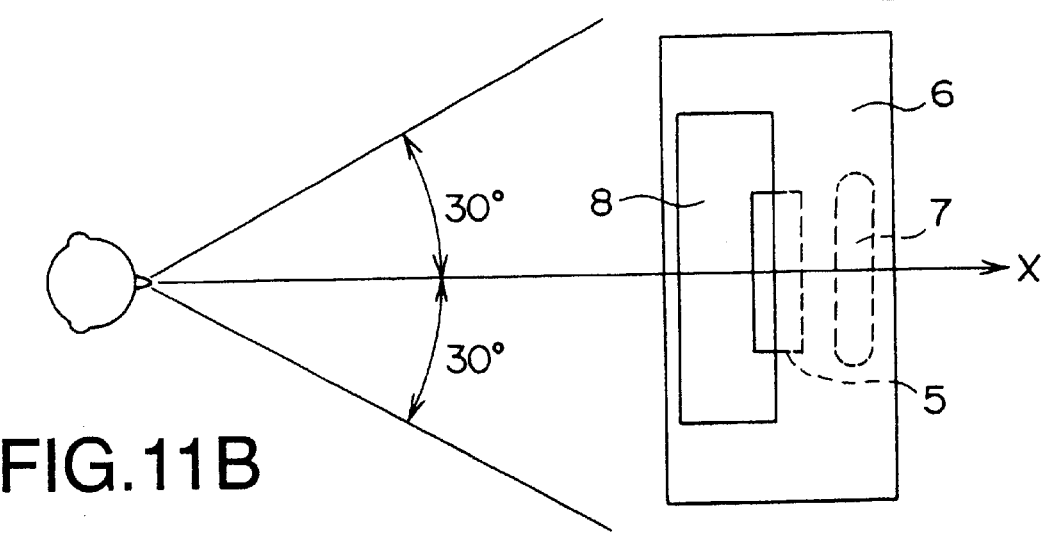
FIG.11B

OPTICAL FIBER COATING DEVICE

BACKGROUND OF THE INVENTION

1. Field of the Invention

The present invention relates to an optical fiber coating device suited to recoat a connecting portion of an optical fiber from which a coat has been removed.

2. Description of the Related Art

As one of methods for connecting two optical fibers to each other, there is a method in which after coatings on the end portions of the respective optical fibers have been removed, those end portions are confronted with each other and then fusion-spliced to each other. In the case where those optical fibers are connected to each other with this method, it is necessary to reinforce the end portions (connecting portions) of the respective optical fibers from which the coatings have been removed through some method. Therefore, up to now, the connecting portion is sandwiched between reinforcing members or is coated with heat shrinkable tubings. However, in order to cope with a high-density packaging of an optical device, it is idealized that an outer diameter of the connecting portion which has been reinforced is made identical with that from which the coating has not yet been removed. Under those circumstances, in recent years, attention has been paid to a method of recoating the connecting portion for reinforcement by an optical fiber coating device.

In the optical fiber coating device which is currently used to recoat the connecting portion of the optical fiber, a mold made up of an upper mold and a lower mold which can be separated from each other is mounted on a device body, and a shielding lid is rotatably fitted onto the device body. The connecting portion of the optical fiber is recoated by the optical fiber coating device in the following manner.

1) After the shielding lid is opened, the upper mold is opened and the connecting portion of the optical fiber is set in a recoat groove formed in an upper surface of the lower mold.

2) The upper mold is closed, and the recoat groove formed in a lower surface of the upper mold is confronted with the recoat groove of the lower mold to receive the connecting portion of the optical fiber between both of the recoat grooves.

3) The shielding lid is closed, and the mold is shielded from an external light.

4) A light-curing resin is injected into the recoat groove in which the connecting portion of the optical fiber is set. In this situation, if occasion demands, the shielding lid is opened and a state in which the light-curing resin is injected into the recoat groove is confirmed.

5) After the light-curing resin of a given amount has been injected into the recoat groove, a lamp fitted on an inner side of the shielding lid is lighted and a light is irradiated onto the light-curing resin from the lamp to cure the resin. Similarly, as occasion demands, the shielding lid is opened and a state in which the light-curing resin is cured is confirmed.

6) After the light-curing resin has been sufficiently cured, the shielding lid and the mold are opened, and the optical fiber is extracted from the mold.

The above conventional optical fiber coating device suffers from the following problem.

1) The large shielding lid must be troublesomely opened or closed every time the injecting state or the curing state of the light-curing resin is confirmed.

2) When the shielding lid is opened, a light-curing resin (for example, a resin remaining in a resin injection path or a resin supply pipe for injecting the resin into the recoat groove) other than the light-curing resin that is injected into the recoat groove is exposed to the external light. As a result, the resin thus exposed is cured to block the resin injection path or the resin supply pipe.

SUMMARY OF THE INVENTION

The present invention has been made to solve the above problems with the conventional optical fiber coating device, and therefore an object of the present invention is to provide an optical fiber coating device which is capable of observing the interior of a mold in a state where a shielding lid is closed.

In order to achieve the above object, according to one aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed.

According to another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an open/close lid that can open/close the observation window.

According to still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed, and an optical shielding guard plate is provided around the observation window.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an open/close lid that can open/close the observation window, and an optical shielding guard plate is provided around the observation window.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and a photo sensor that can detect the quantity of light of the light source.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, an open/close lid that can open/close the observation window, and a photo sensor that can detect the quantity of light of the light source.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and a photo sensor that can detect the quantity of light of the light source, and an optical shielding guard plate is provided around the observation window.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, an open/close lid that can open/close the observation window, and a photo sensor that can detect the quantity of light of the light source, and an optical shielding guard plate is provided around the observation window.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and a photo sensor that can detect the quantity of light of the light source, and the quantity of light of the light source is automatically adjusted on the basis of the detected result of the photo sensor.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, an open/close lid that can open/close the observation window, and a photo sensor that can detect the quantity of light of the light source, and the quantity of light of the light source is automatically adjusted on the basis of the detected result of the photo sensor.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and a photo sensor that can detect the quantity of light of the light source, an optical shielding guard plate is provided around the observation window, and the quantity of light of the light source is automatically adjusted on the basis of the detected result of the photo sensor.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, an open/close lid that can open/close the observation window, and a photo sensor that can detect the quantity of light of the light source, an optical shielding guard plate is provided around the observation window, and the quantity of light of the light source is automatically adjusted on the basis of the detected result of the photo sensor.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed, and a filter that cuts off a light of a light-curing resin curing band is provided on the observation window.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein a TV camera that can capture the interior of the mold is provided inside of the shielding lid, and a TV monitor that can display an image captured by the TV camera is provided outside of the shielding lid.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed, a filter that cuts off a light of a light-curing resin curing band is provided on the observation window, a TV camera that can capture the interior of the mold is provided inside of the shielding lid, and a TV monitor that can display an image captured by the TV camera is provided outside of the shielding lid.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an illumination light source that illuminates the mold with a light not including a curing band component of the light-curing resin, and a filter that cuts off a light of a light-curing resin curing band is provided on the observation window.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an illumination light source that illuminates the mold with a light not including a curing band component of the light-curing resin, a TV camera that can capture the interior of the mold is provided inside of the shielding lid, and a TV monitor that can display an image captured by the TV camera is provided outside of the shielding lid.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an illumination light source that illuminates the mold with a light not including a curing band component of the light-curing resin, a filter that cuts off a light of a light-curing resin curing band is provided on the observation window, a TV camera that can capture the interior of the mold is provided inside of the shielding lid, and a TV monitor that can display an image captured by the TV camera is provided outside of the shielding lid.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed, a filter that cuts off a light of a light-curing resin curing band is provided on the observation window, and a lens that enables the interior of the mold to be enlarged and observed is provided on both or one of the inside and the outside of the observation window.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed, a filter that cuts off a light of a light-curing resin curing band is provided on the observation window, a lens that enables the interior of the mold to be enlarged and observed is provided on both or one of the inside and the outside of the observation window, a TV camera that can capture the interior of the mold is provided inside of the shielding lid, and a TV monitor that can display an image captured by the TV camera is provided outside of the shielding lid.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an illumination light source that illuminates the mold with a light not including a curing band component of the light-curing resin, a filter that cuts off a light of a light-curing resin curing band is provided on the observation window, and a lens that enables the interior of the mold to be enlarged and observed is provided on both or one of the inside and the outside of the observation window.

According to yet still another aspect of the present invention, there is provided an optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an illumination light source that illuminates the mold with a light not including a curing band component of the light-curing resin, a filter that cuts off a light of a light-curing resin curing band is provided on the observation window, a lens that enables the interior of the mold to be enlarged and observed is provided on both or one of the inside and the outside of the observation window, a TV camera that can capture the interior of the mold is provided inside of the shielding lid, and a TV monitor that can display an image captured by the TV camera is provided outside of the shielding lid.

BRIEF DESCRIPTION OF THE DRAWINGS

These and other objects and advantages of this invention will become more fully apparent from the following detailed description given with the accompanying drawings in which:

FIG. 11A is a diagram showing a desirable position at which an observation window mold is located in a vertical direction;

FIG. 11B is a diagram showing a desirable position at which the observation window mold is located in a horizontal direction;

DETAILED DESCRIPTION

Now, a description will be given in futher detail of preferred embodiments of the present invention with reference to the accompanying drawings.

An example of an optical fiber coating device in accordance with an embodiment of the present invention will be described hereinafter. In this example, a coating removed portion of an optical fiber to be recoated is end portions (hereinafter referred to as "connecting portion") of two optical fibers which are fusion-spliced to each other after the coatings of those end portions have been removed.

The optical fiber coating device includes a device body on which a mold is mounted, a shielding lid which is fitted to the device body so as to be openable and closeable and can shield the mold from the external light, and a light source fitted to the inside of the shielding lid. Accordingly, the interior of the mold into which the connecting portion of the optical fiber is set is filled with light-curing resin, and a light is irradiated onto the filled light-curing resin from the light source to cure the light-curing resin, thereby being capable of recoating the connecting portion with the light-curing resin.

Figure 1:
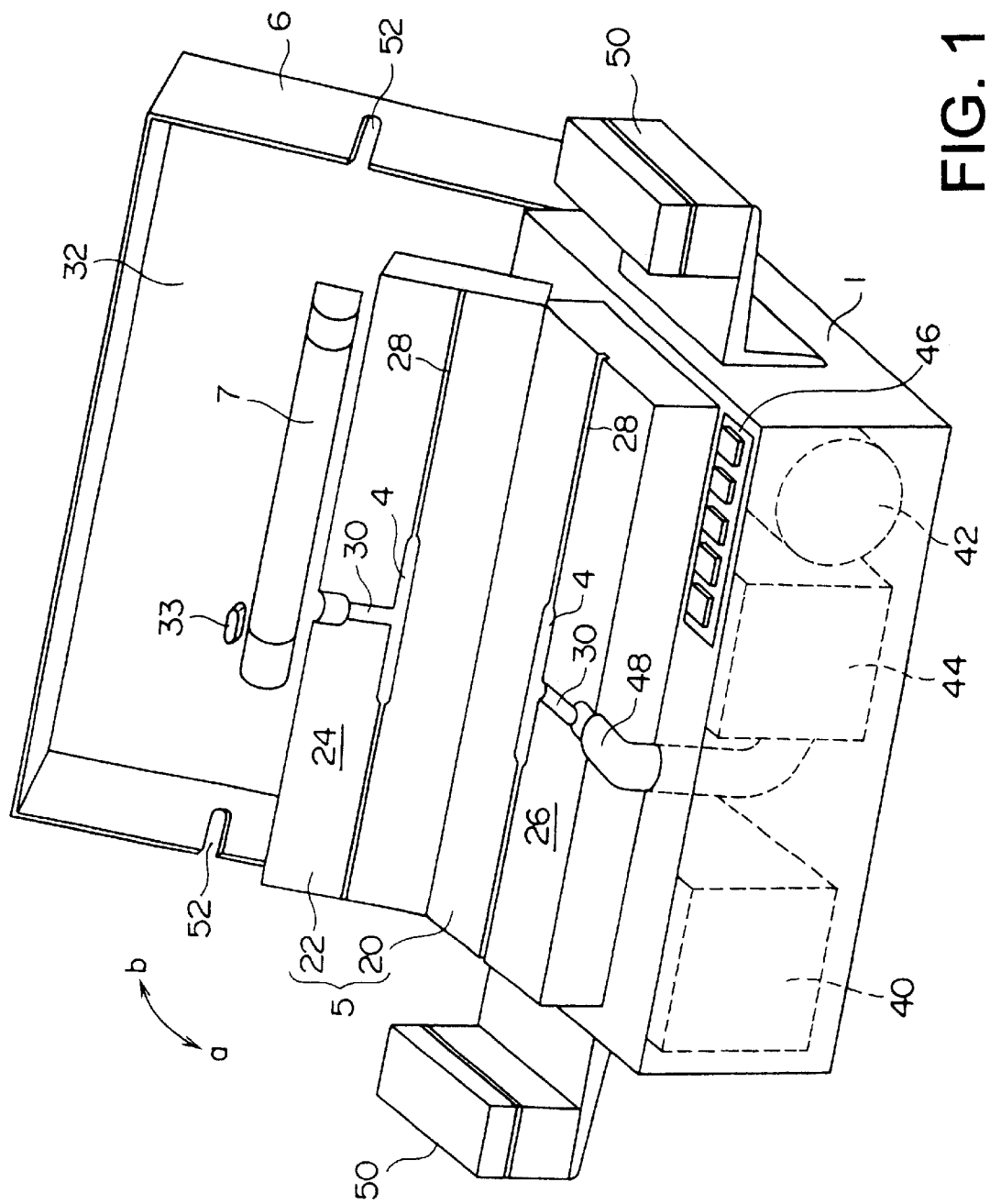
FIG. 1 is a diagram showing an example of an optical fiber coating device in accordance with the present invention.
Figure 2:
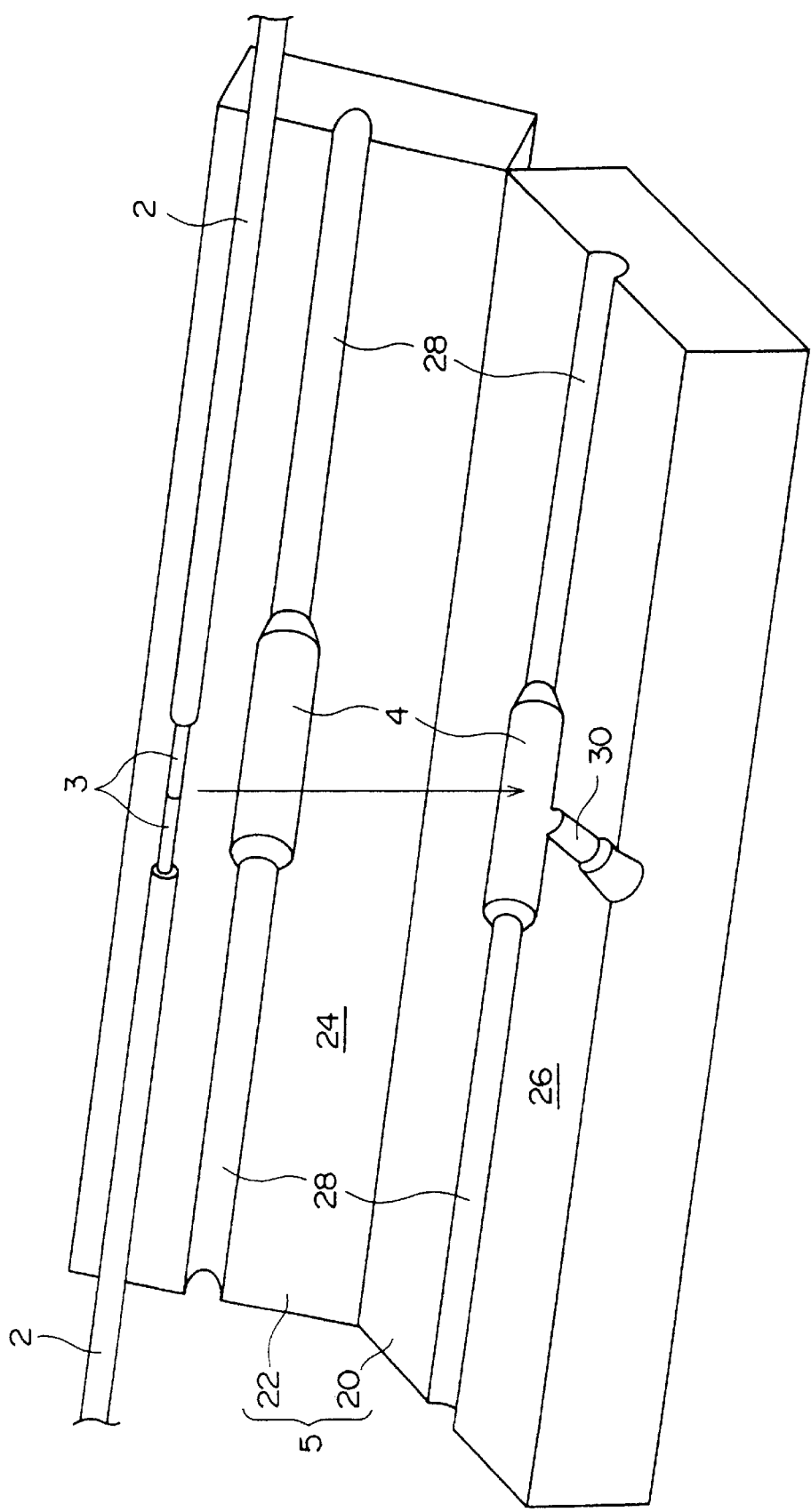
FIG. 2 is a diagram showing an example of a mold that constitutes the optical fiber coating device in accordance with the present invention.

As shown in FIG. 1, the mold 5 is made up of a lower mold 20 which is made of quartz glass and fixed to a lower surface of the device body 1, and an upper mold 22 which is made of quartz glass and rotatably fitted to the upper mold 22 in a direction indicated by an arrow a–b in the figure. As shown in FIG. 2, slender grooves 4 (hereinafter referred to as "recoat grooves 4") semi-circular in section into which the connecting portion 3 of the optical fiber 2 can be fitted are formed in the centers of joint surfaces (a lower surface 24 of the upper mold 22 and an upper surface 26 of the lower mold 20) of the upper mold 22 and the lower mold 20, respectively. With this structure, when the upper mold 22 is rotated in a direction indicated by an arrow a of FIG. 1 and then superimposed on the lower mold 20 (both of those joint surfaces are joined together) after the connecting portion 3 has been fitted into the recoat groove 4 of the lower mold 20, both of the recoat grooves 4 formed in the respective joint surfaces of the upper mold 22 and the lower mold 20 are confronted with each other, and the connecting portion 3 is received between the respective recoat grooves 4 that are confronted with each other. Fitting grooves 28 into which parts of the coated portions contiguous to the connecting portion 3 of the optical fiber 2 set between those recoat grooves 4 can be fitted are formed on both of the outer sides of the recoat grooves 4 of the upper mold 22 and the lower mold 20 in the longitudinal direction.

As shown in FIG. 1, concave grooves 30 are formed in the lower surface 24 of the upper mold 22 and the upper surface 26 of the lower mold 20 in a direction orthogonal to the recoat grooves 4, respectively (the recess groove in the upper mold is omitted in FIG. 2). Therefore, when the respective recoat grooves 4 are confronted with each other in the manner described above (the upper mold 22 is piled up on the lower mold 20), the respective recess grooves 30 are also confronted with each other, to thereby form a flow path into which the light-curing resin is injected between the respective recoat grooves 4 into which the connecting portion 3 of the optical fiber 2 is set.

Figure 3:
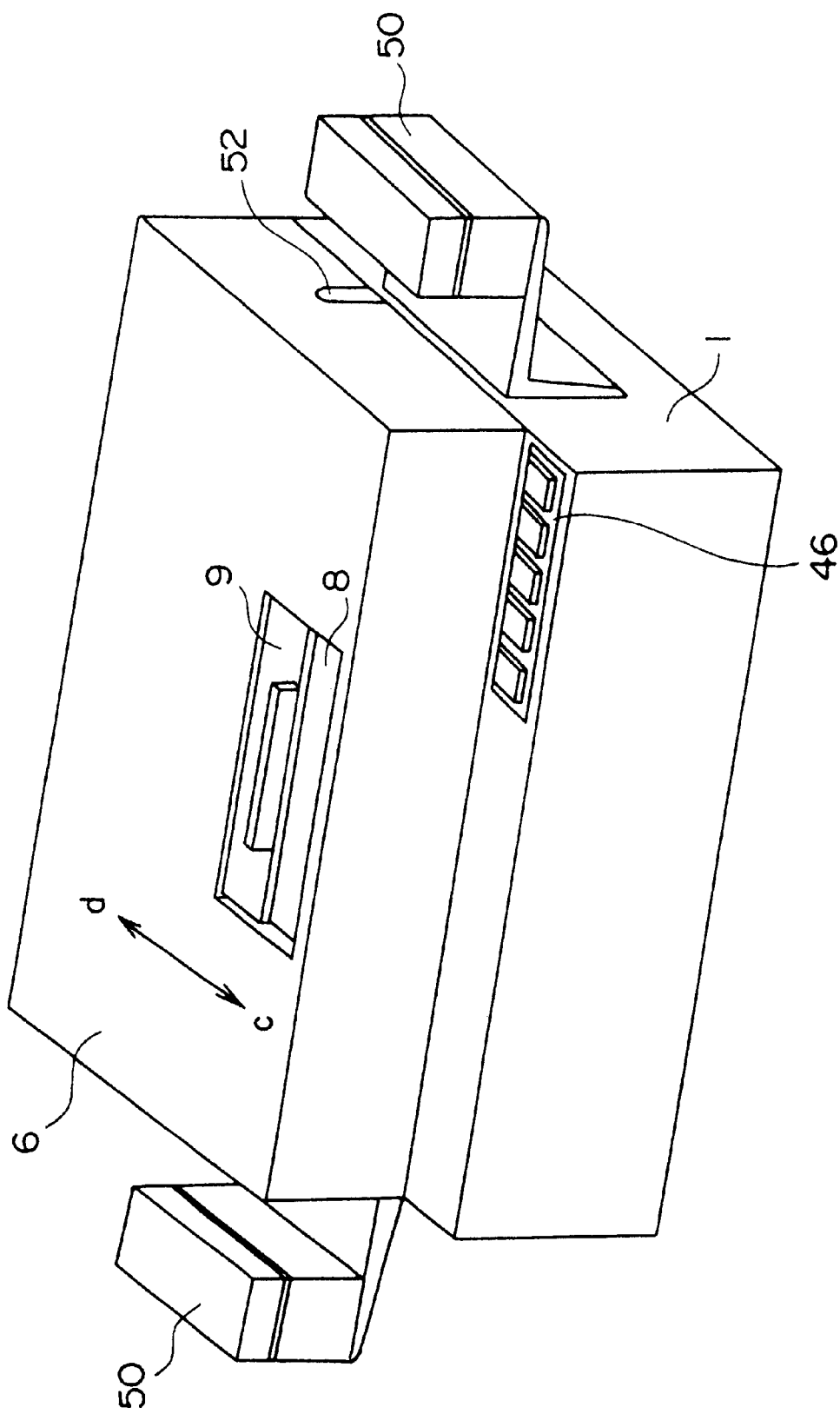
FIG. 3 is a diagram showing one example of an observation window and an open/close lid provided on the observation window.

As shown in FIG. 1, the shielding lid 6 is a box opened downwardly. The shielding lid 6 is fitted to the device body 1 so as to be rotatable (openable and closeable) in the direction indicated by the arrow a–b in the figure. With this structure, when the shielding lid 6 is rotated in the direction indicated by the arrow a in the figure (closed), the mold 5 is covered with the shielding lid 6 with the result that the mold 5 is not exposed to the external light. Also, a light source 7 (for example, an ultraviolet lamp) is fitted inside of a ceiling board 32 of the shielding lid 6. With this structure, when the shielding lid 6 is closed and the light source 7 turns on, a light emitted from the light source 7 is irradiated onto the mold 5, to thereby cure the light-curing resin filled between the recoat grooves 4 that are confronted with each other. As shown in FIG. 3, the ceiling board 32 of the shielding lid 6 is formed with a rectangular observation window 8 through which an injection state and a curing state of the light-curing resin can be confirmed even if the shielding lid 6 is not opened. The observation window 8 is fitted with an open/close lid 9 that can open and close the observation window 8 by sliding in a direction indicated by an arrow c–d in FIG. 3. With this structure, when an intention is made to confirm the injection state or the curing state of the light-curing resin, the open/close lid 9 is slid in a direction indicated by an arrow d to open the observation window 8, and in the other situation, the open/close lid 9 is slid in a direction indicated by an arrow c to close the observation window 8, thereby being capable of preventing the entrance of the external light.

As shown in FIG. 1, the device body 1 has a control section 40, a resin tank 42 and a pump 44 built-in. When a given button of an operating panel 46 is depressed to actuate the pump 44, the light-curing resin is pumped out of the resin tank 42 and then transported to a supply pipe 48. The resin transported to the supply pipe 48 is filled between the recoat grooves 4 into which the connecting portion 3 is set through the flow path.

The coating removed portion of the optical fiber (the connecting portions of two optical fibers which have been fusion-spliced to each other) is recoated by using the optical fiber coating device shown in FIG. 1 in the following manner.

1) The shielding lid 6 is opened in the direction indicated by the arrow b in FIG. 1, and the upper mold 22 of the mold 5 rotates in the same direction.

2) As shown in FIG. 2, the connecting portion 3 of the optical fiber 2 is set within the recoat groove 4 formed in the upper surface 26 of the lower mold 20 of the mold 5 from above. At the same time, parts of the coated portions contiguous to the connecting portion 3 are set within the fitting grooves 28, respectively.

3) The upper mold 22 rotates in the direction indicated by the arrow a in FIG. 1 and is then superimposed on the lower mold 20. With this operation, the respective recoat grooves 4 of the upper mold 22 and the lower mold 20 are confronted with each other while the respective fitting grooves 28 are confronted with each other, and the connecting portion 3 is received between the respective recoat grooves 4 while the parts of the coated portions contiguous to the connecting portion 3 are received between the respective fitting grooves 28, respectively.

4) The respective coated portions of the optical fiber 2 which are projected outward from the mold 5 are nipped and held by clamps 50 projected from both side surfaces of the device body 1 in the longitudinal direction, respectively.

5) The shielding lid 6 is closed in the direction indicated by the arrow a in FIG. 1 to cover the mold 5. As shown in FIG. 1, slender notches 52 are formed on both side surfaces of the shielding lid 6 in the longitudinal direction, respectively, to thereby prevent the shielding lid 6 and the optical fiber 2 from interfering with each other.

6) A given button of the operating panel 46 is depressed to actuate the pump 44, whereby the light-curing resin within the resin tank 42 (for example, ultraviolet curing epoxy acrylate resin) is injected between the confronted recoat groove 4 (filled around the connecting portion 3). In this situation, as occasion demands, the open/close lid 9 is operated to open the observation window 8, and the injection state of the light-curing resin is confirmed.

7) A given button of the operating board 46 is depressed to turn on the light source 7, and the ultraviolet rays are irradiated onto the light-curing resin filled around the connecting portion 3 of the optical fiber 2 to cure the resin. Similarly, in this situation, as occasion demands, the open/close lid 9 is operated to open the observation window 8, and the curing state of the light-curing resin is confirmed. The optical fiber coating device according to the present invention includes a photo sensor (for example, an ultraviolet sensor) 33 which can detect the quantity of ultraviolet rays irradiated onto the mold 5. The detected result of the photo sensor 33 is compared with a predetermined table value to calculate a difference between the detected result and the table value by the control section 40. The control section 40 automatically controls the quantity of light so as to reduce the difference as much as possible.

8) After the light-curing resin has been satisfactorily cured, the shielding lid 6 is opened in the direction indicated by the arrow b in FIG. 1, and the upper mold 22 of the mold 5 is rotated in the same direction to take out the optical fiber 2.

Figure 4:
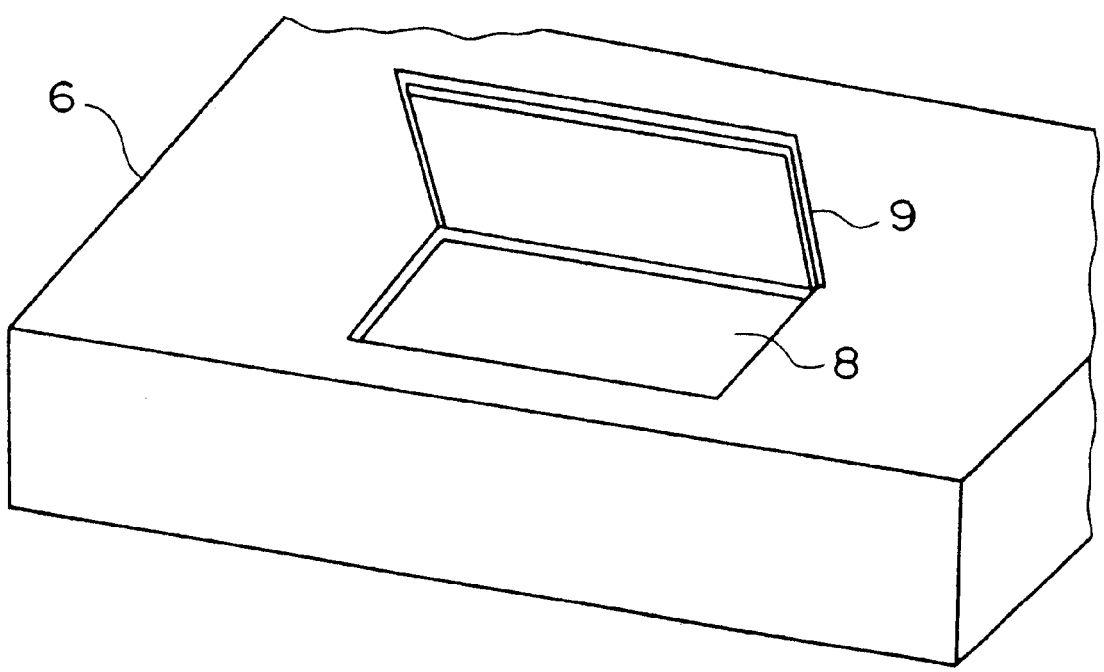
FIG. 4 is a diagram showing another example of an observation window and an open/close lid provided on the observation window.

As shown in FIG. 4, the open/close lid 9 may be so rotated as to open/close the observation window 8.

Figure 5:
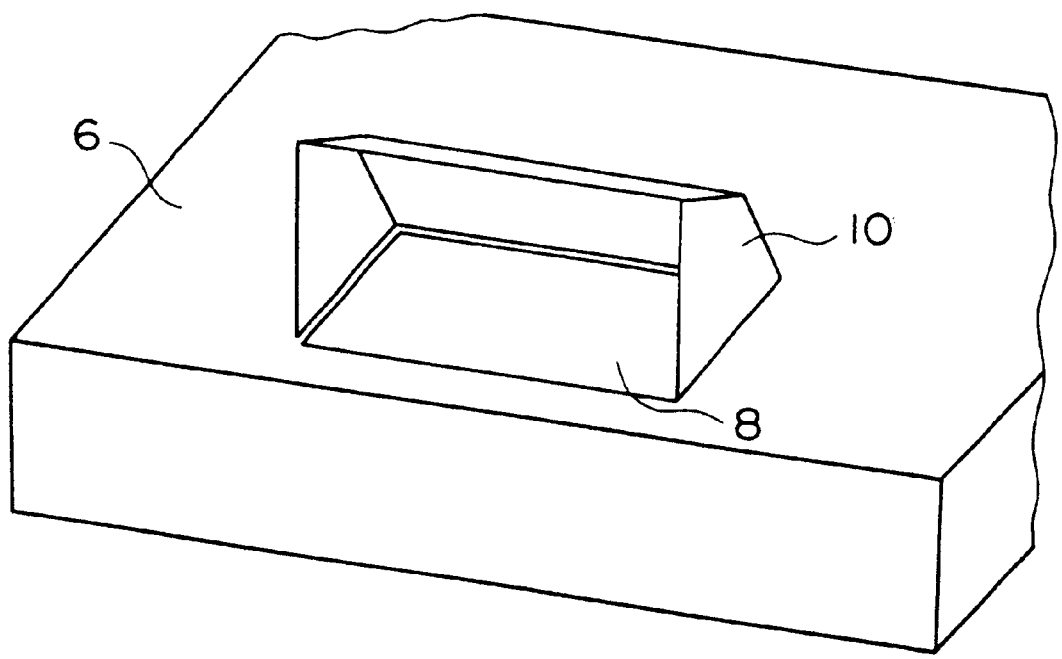
FIG. 5 is a diagram showing an example of an observation window and a shield plate provided around the observation window.

As shown in FIG. 5, an optical shielding guard plate (or hood) 10 that prevents the entrance of the external light may be projected entirely or partially from the periphery of the observation window 8 instead of the provision of the open/close lid 9. It is needless to say that the optical shielding guard plate 10 may be provided in addition to the provision of the open/close lid 9. In any cases, the optical shielding guard plate 10 can prevent the entrance of the external light into the interior of the observation window 8, and it is desirable that the optical shielding guard plate 10 is so arranged as to prevent interfering with an operator's view when the internal mold 5 is confirmed from the observation window 8. In particular, the optical shielding guard plate 10 is effective in employment at a location where an incident direction of the external light can be specified.

The shielding lid 6 and the upper mold 22 of the mold 5 may be opened and closed in conjunction with each other. For example, the upper mold 5 may be fixed onto the shielding lid 6 so that they are opened and closed together.

Figure 6:
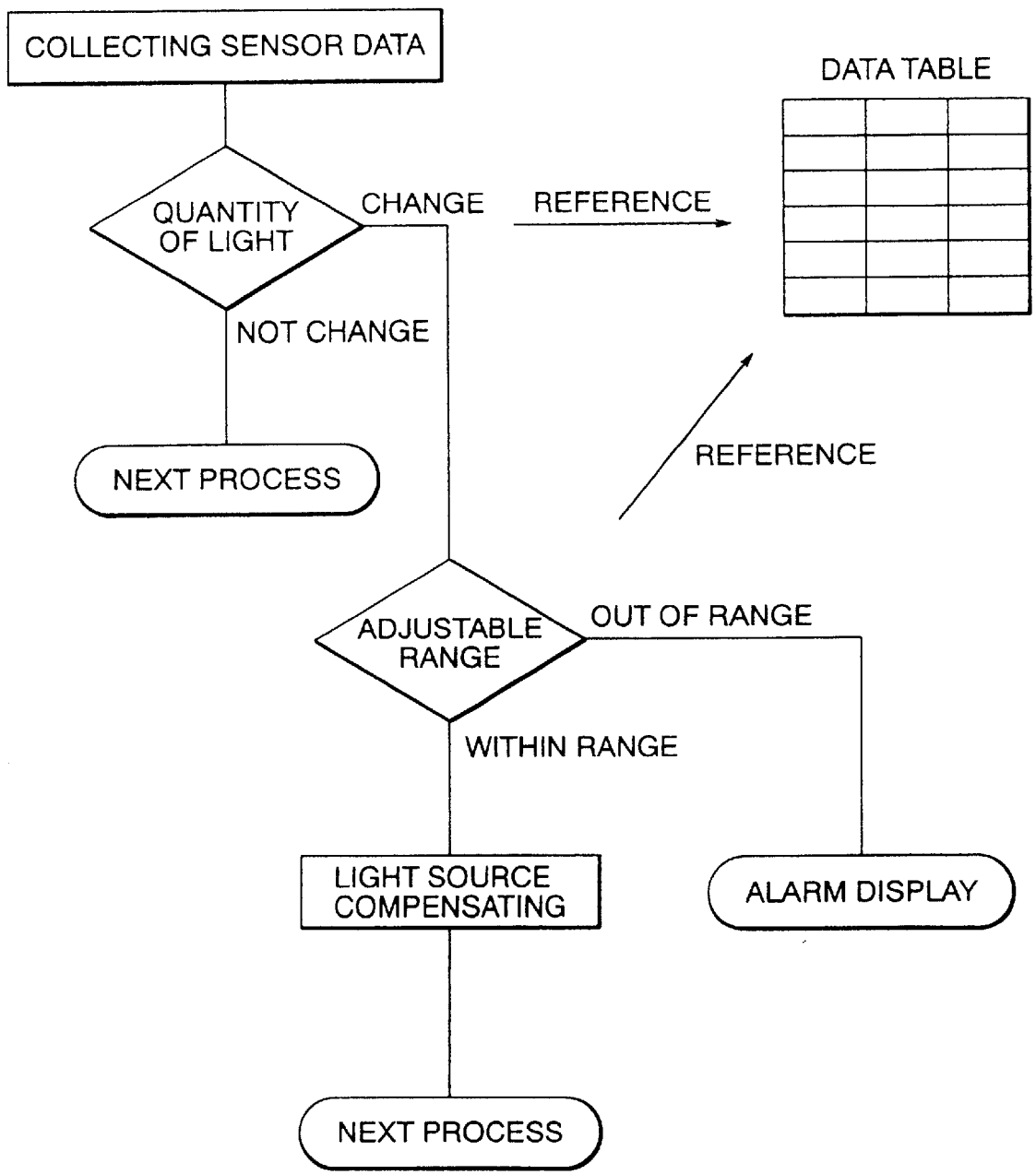
FIG. 6 is a flowchart showing an example of a light source compensating process.

In the case of providing the photo sensor 33, if the amount of ultraviolet rays detected by the photo sensor 33 is remarkably changed with respect to the predetermined table value, an alarm may be raised to urge to exchange the light source 7. For example, in the case where the quantity of ultraviolet rays becomes lower than an allowable quantity because the light source 7 is deteriorated, an alarm can be raised to urge to exchange the light source 7. More specifically, as shown in FIG. 6, the detected results of the photo sensor 33 are collected (sensor data is collected), and it is judged whether the quantity of light of the light source 7 changes or not. As a result, if there is no change in the quantity of light, the operation is advanced to a succeeding process whereas if there is a change in the quantity of light, it is judged whether the change is within an adjustable range or not, referring to the table value. As a result, if the change is within the adjustable range, the quantity of light is adjusted, and the operation is then advanced to the succeeding process. On the contrary, if the change is out of the adjustable range, an alarm is raised to urge to exchange the light source 7. It is desirable that the above-described process (light source compensating process) is conducted between the processes (7) and (8) among the above series of recoating process.

Figure 7:
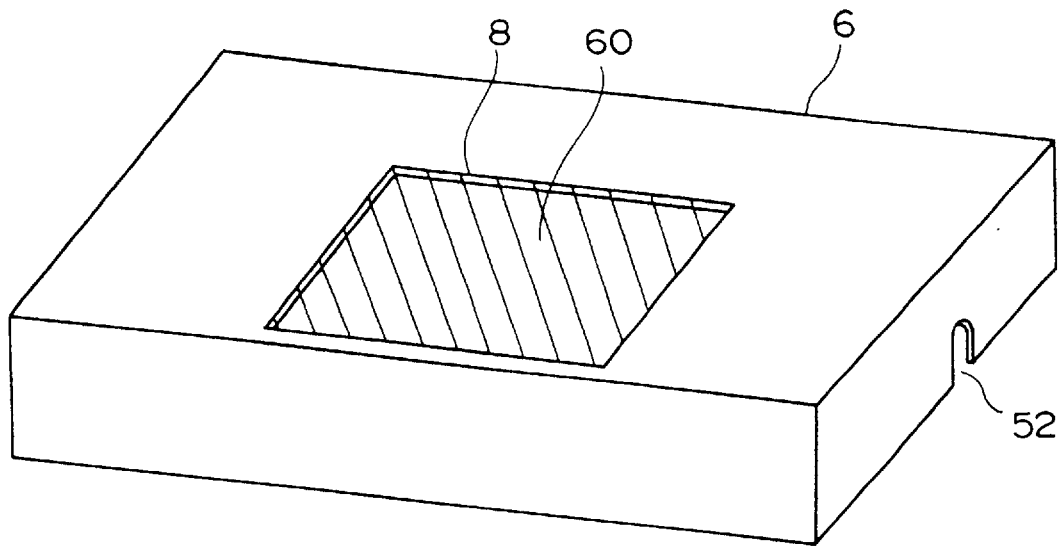
FIG. 7 is a diagram showing an example of an observation window and an ultraviolet cut-off filter stuck on the observation window.

A filter that can cut off a light of a light-curing resin curing band can be provided on the observation window 8 instead of the open/close lid 9 or together with the open/close lid 9. For example, as shown in FIG. 7, if an ultraviolet cut-off filter 60 is stuck onto the observation window 8, the ultraviolet rays among the external light can be prevented from entering into the inside of the shielding lid 6 from the observation window 8. As a result, the injection state of the ultraviolet curing resin into the recoat grooves 4 and the curing state of the ultraviolet curing resin can be always confirmed without opening or closing the shielding lid 6, and there is no case in which the ultraviolet curing resin is cured by the ultraviolet rays entered from the observation window 8.

Figure 8:
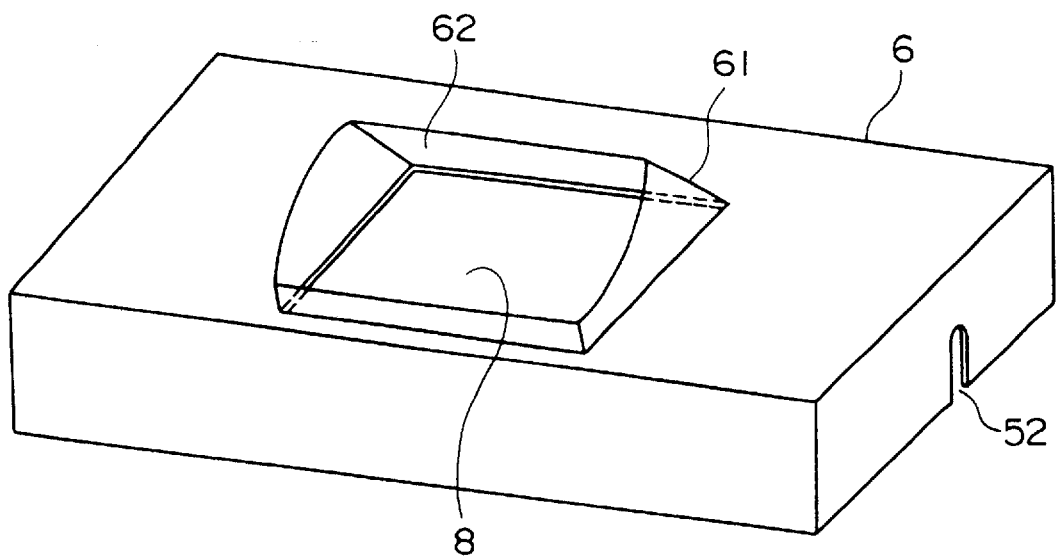
FIG. 8 is a diagram showing an example of an observation window and a lens provided on the observation window.

As shown in FIG. 8, it is possible that a peripheral wall 61 is erected on the peripheral edge of the observation window 8, and a lens 62 is fitted into the upper end of the inside of the peripheral wall 61 to enlarge the interior of the mold 5 not shown in the figure (the recoat grooves 4 and the connecting portion 3 of the optical fiber 2 set into the recoat grooves 4) so as to be observable. In FIG. 8, the lens 62 is provided outside of the observation window 8. Alternatively, the lens 62 may be provided inside of the observation window 8 (inside of the shielding lid 6). Also, the ultraviolet cut-off filter can be stuck onto the observation window 8 or the lens 62.

Figure 9:
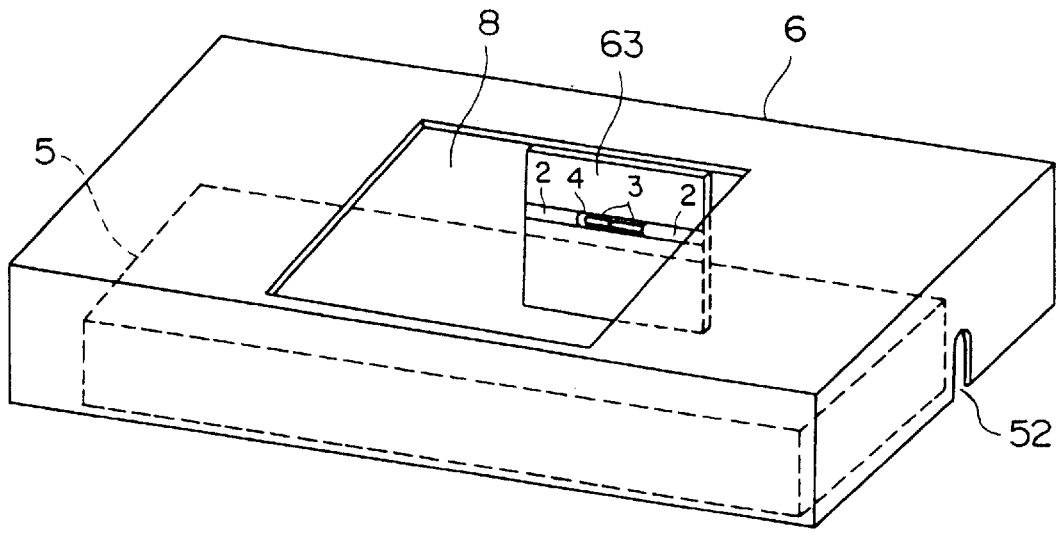
FIG. 9 is a diagram showing an example of a mirror provided inside of a shielding lid.

As shown in FIG. 9, a mirror 63 is located inside of the shielding lid 6 and the rear surface side of the interior of the mold 5 (the recoat grooves 4 and the connecting portion 3 of the optical fiber 2 set into the recoat grooves 4) which can not be directly observed from the observation window 8 is projected on the mirror 63 so that an image projected on the mirror 63 can be observed from the observation window 8. With this structure, the recoat grooves 4 and the connecting portion 3 of the optical fiber 2 set into the recoat grooves 4 can be observed from two different directions. However, a position at which the mirror 63 is located is not limited to the position shown in the figure. The mirror 63 can be located anywhere as long as portions of the recoat grooves 4 of the mold 5 and the connecting portion 3 of the optical fiber 2 set into the recoat grooves 4 which cannot be observed directly from the observation window 8 can be projected on the mirror 63, and an image projected on the mirror 63 can be observed from the observation window 8. Similarly, the ultraviolet cut-off filter can be stuck onto the observation window 8 shown in FIG. 9.

Figure 10:
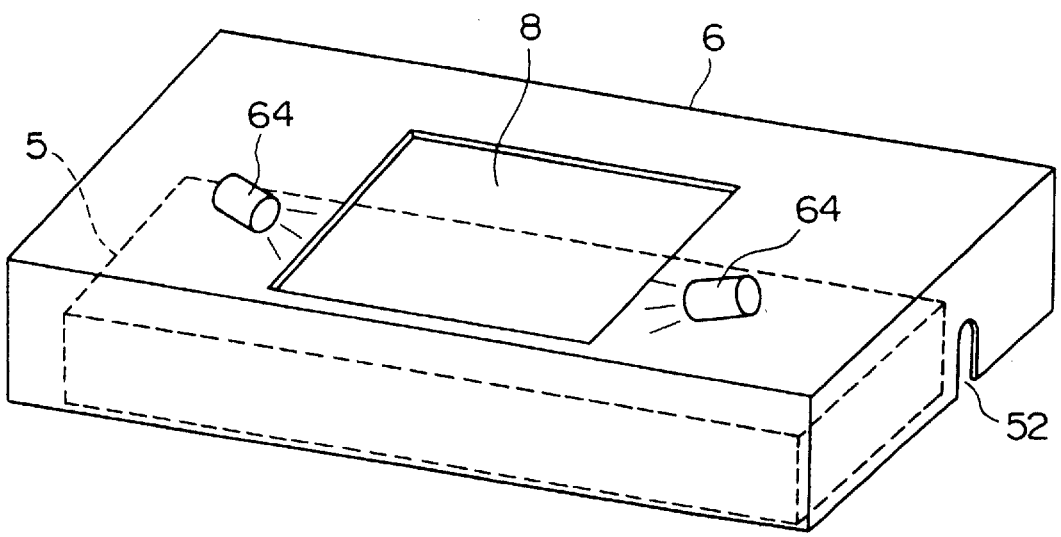
FIG. 10 is a diagram showing an illumination light source provided inside of the shielding lid.

As shown in FIG. 10, an illumination light source 64 that generates a light having no ultraviolet component is provided inside of the shielding lid 6 so as to illuminate the recoat grooves 4 of the mold 5 and the connecting portion 3 of the optical fiber 2 set into the recoat grooves 4 (not shown). For example, the illumination light sources 64 are fitted to both of outer sides of the observation window 8 in the longitudinal direction among the inner surface of the shielding lid 6 so as to illuminate the recoat grooves 4 of the mold 5 and the connecting portion 3 of the optical fiber 2 set into the recoat grooves 4 (not shown) obliquely from the upper. A position at which the illumination light source 64 is mounted is not limited to the position shown in the figure. The illumination light source 64 can be located somewhere if the illumination light source 64 can illuminate the recoat grooves 4 of the mold 5 and the connecting portion 3 of the optical fiber 2 set into the recoat grooves 4 (not shown), and if the illumination light source 64 does not interfere with the operator's view when the recoat grooves 4 and the connecting portion 3 are observed from the observation window 8. Also, the number of the illumination light sources 64 is not particularly limited. Similarly, the ultraviolet cut-off filter can be stuck onto the observation window 8 shown in FIG. 10.

The desirable positions at which the observation window 8 and the mold 5 are located will be described with reference to FIGS. 11A and 11B. From the viewpoint of confirming the interior of the mold 5 from the observation window 8, it is desirable that the observation window 8 and the mold 5 are so located as to exist within the visual field regions of the following (1) to (3).

1) Within the visual field region which is 45° to 50° downward from a horizontal reference visual line X of a sitting or standing operator (FIG. 11A), and 30° in the right and left directions with the reference visual line X as a center, respectively (FIG. 11B).

2) Within the visual field region which is 40° to 55° downward from the horizontal reference visual line X (FIG. 11A), and 30° in the right and left directions with the reference visual line X as a center, respectively (FIG. 11B).

3) Within the visual field region which is 10° to 40° downward from the horizontal reference visual line X (FIG. 11A), and 30° in the right and left directions with the reference visual line X as a center, respectively (FIG. 11B).

Among the above visual field regions 1) to 3), the visual field region 1) is most desirable, the visual field region 2) is more desirable, and the visual field region 3) is desirable. Also, it is desirable that the members (the light source 7, the pump 44, the resin tank 42, and so on) other than the observation window 8 and the mold 5 are so arranged as to exist out of those visual field regions.

Figure 12:
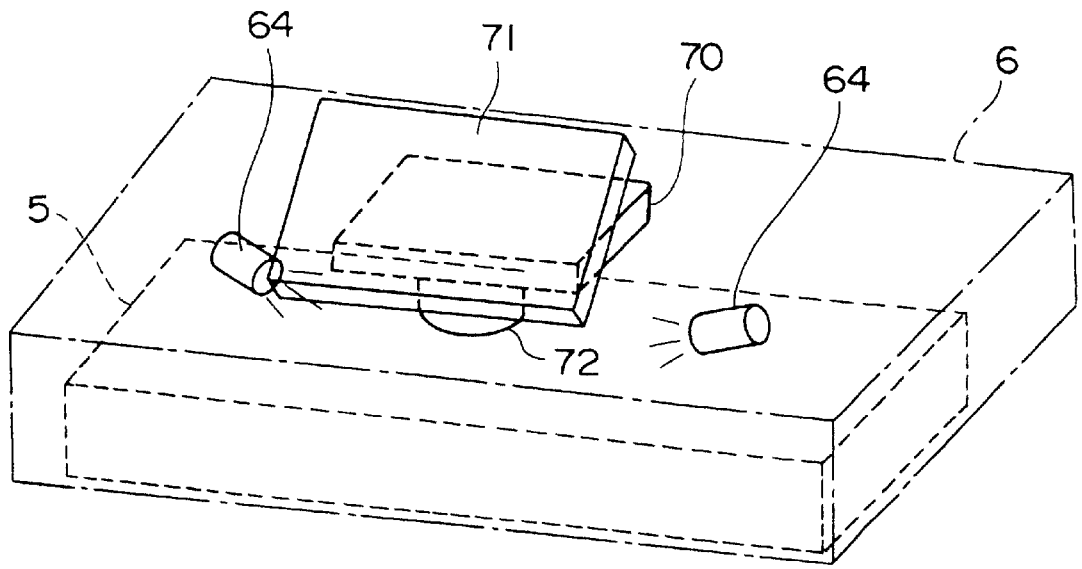
FIG. 12 is a diagram showing an example of a state in which a TV camera and a TV monitor are arranged.

It is possible that a TV camera that can capture the interior of the mold 5 is provided inside of the shielding lid 6, and a TV monitor that can display an image captured by the TV camera is provided outside of the shielding lid 6. For example, as shown in FIG. 12, the TV camera 70 is fitted to the inner surface of the shielding lid 6 downward so that the TV camera 70 can capture the recoat grooves and the connecting portion of the optical fiber set into the recoat grooves which are not shown from above. Also, a liquid crystal monitor 71 is fitted onto the outer surface of the shielding lid 6. In addition, the illumination light source 64 shown in FIG. 10 is fitted inside of the shielding lid 6. With this structure, even if the shielding lid 6 is not opened, the injection state of the ultraviolet curing resin into the recoat grooves and the curing state of the ultraviolet curing resin can be observed by the TV monitor 71. It is desirable that a microscope 72 that enlarges and photographs the recoat grooves and the connecting portion of the optical fiber set into the recoat grooves is fitted to a leading portion of the TV camera 70.

Figure 13:
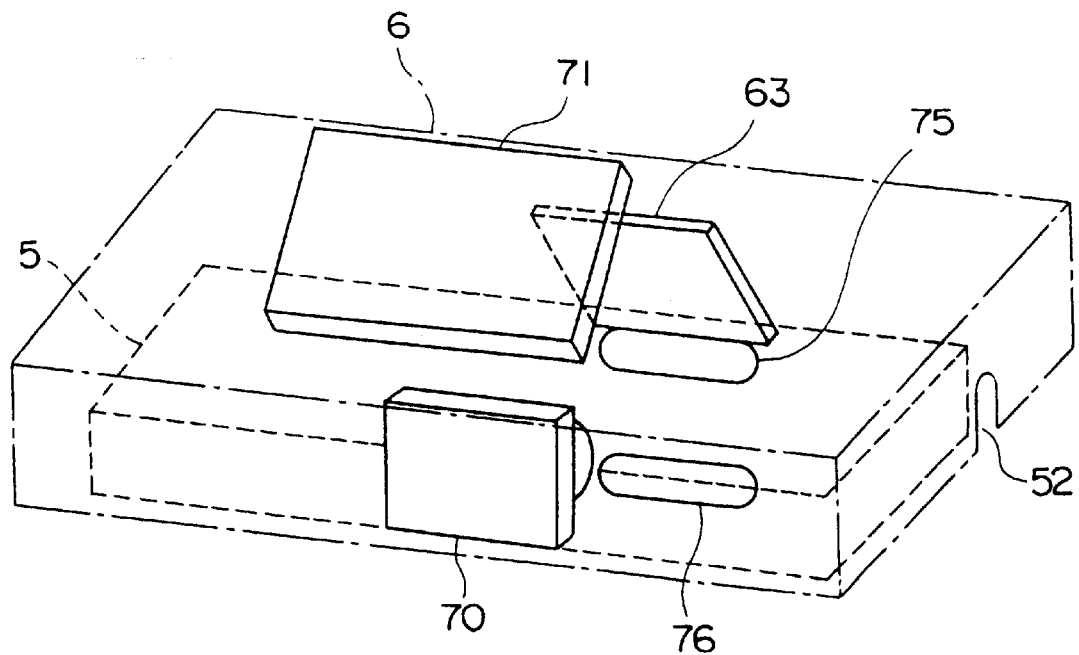
FIG. 13 is a diagram showing an example of a state in which a TV camera, a TV monitor and a mirror are arranged.
Figure 14A:
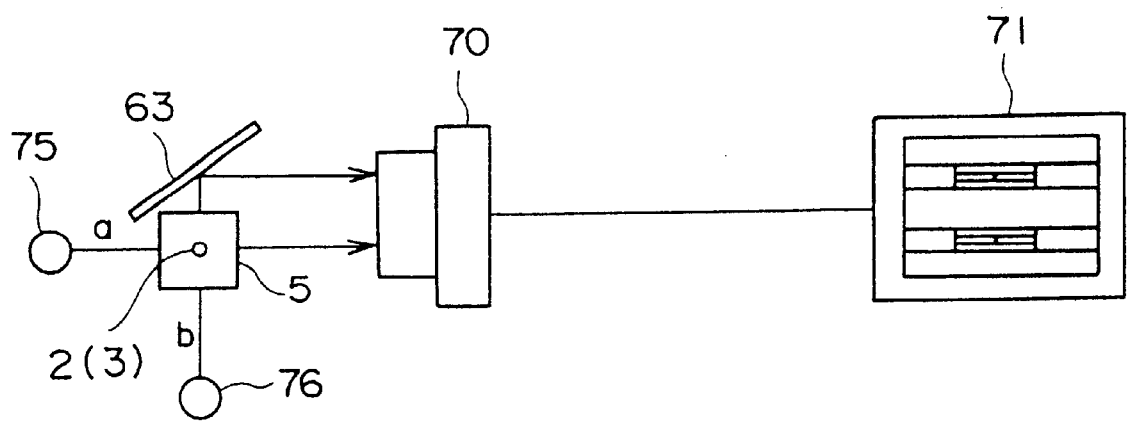
FIG. 14A is a diagram showing a state in which the TV camera and the TV monitor shown in FIG. 13 are arranged in such a direction that a direction of scanning lines is in parallel with the optical axis of the optical fiber.

As shown in FIG. 13, the mirror 63 shown in FIG. 9 is provided inside of the shielding lid 6, and portions of the recoat grooves 4 and the connecting portion 3 of the optical fiber 2 set into the recoat grooves 4 (not shown) which cannot be captured directly by the TV camera 70 can be projected on the mirror 63, and an image projected on the mirror 63 can be captured by the TV camera 70. That is, the recoat grooves 4 of the mold and the connecting portion 3 of the optical fiber 2 set into the recoat grooves 4 can be captured from two different directions by the TV camera 70. More specifically, as shown in FIG. 14A, the TV camera 70 is located in front of the mold 5, and the light source 75 is located at an opposite side (the back side of the mold 5) of the TV camera 70 with the mold 5 intervening between. With this structure, an image of light that has permeated through the interior of the mold 5 (the recoat grooves 4 and the connecting portion 3 of the optical fiber 2 set into the recoat grooves 4) in the direction indicated by the arrow a in the figure can be captured by the TV camera 70. Also, another light source 76 different from the light source 75 is located below the mold 5. In addition, a mirror 63 is located at an opposite side of the light source 76 (above the mold 5) with the mold 5 intervening between. With this structure, an image of light that has permeated through the interior of the mold 5 (the recoat grooves and the connecting portion 3 of the optical fiber 2 set into the recoat grooves) in the direction indicated by the arrow b in the figure is projected on the mirror 63, and the image projected on the mirror 63 can be captured by the TV camera 70.

Figure 14B:
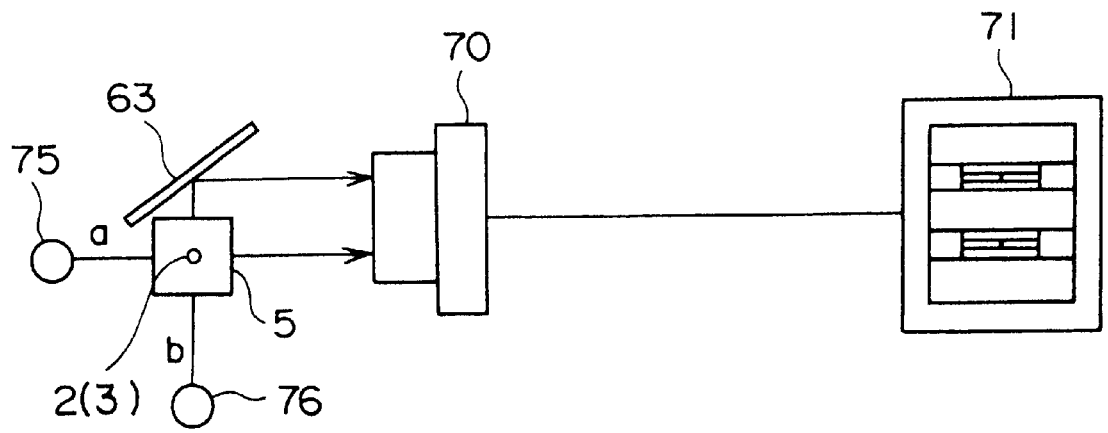
FIG. 14B is a diagram showing a state in which the TV camera and the TV monitor shown in FIG. 13 are arranged in such a direction that a direction of scanning lines is perpendicular to the optical axis of the optical fiber.

The TV camera 70 shown in FIG. 14A is located such that a direction of the scanning line is in parallel with the optical axis of the connecting portion 3 of the optical fiber 2 which is to be observed. As shown in FIG. 14B, the TV camera 70 may be located such that the direction of the scanning line is perpendicular to the optical axis of the connecting portion 3 of the optical fiber 2. In any case, the TV monitor 71 is located such that the direction of scanning line coincides with the direction of scanning line of the TV camera 70.

Figure 15:
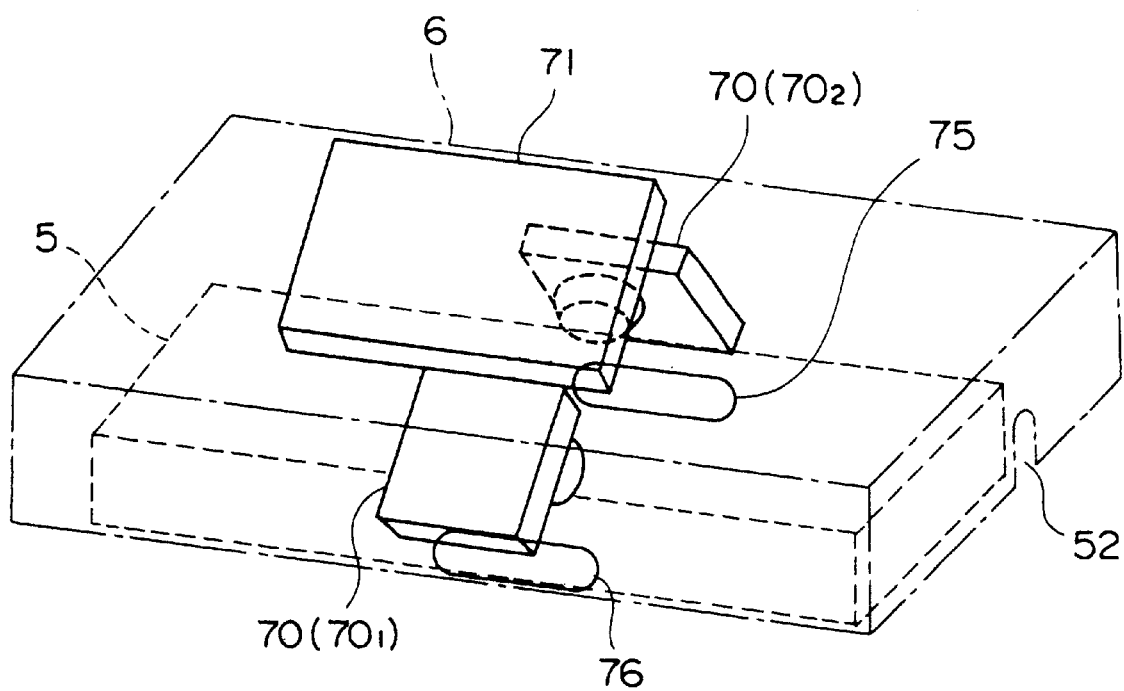
FIG. 15 is a diagram showing a state in which two TV cameras are provided.
Figure 16:
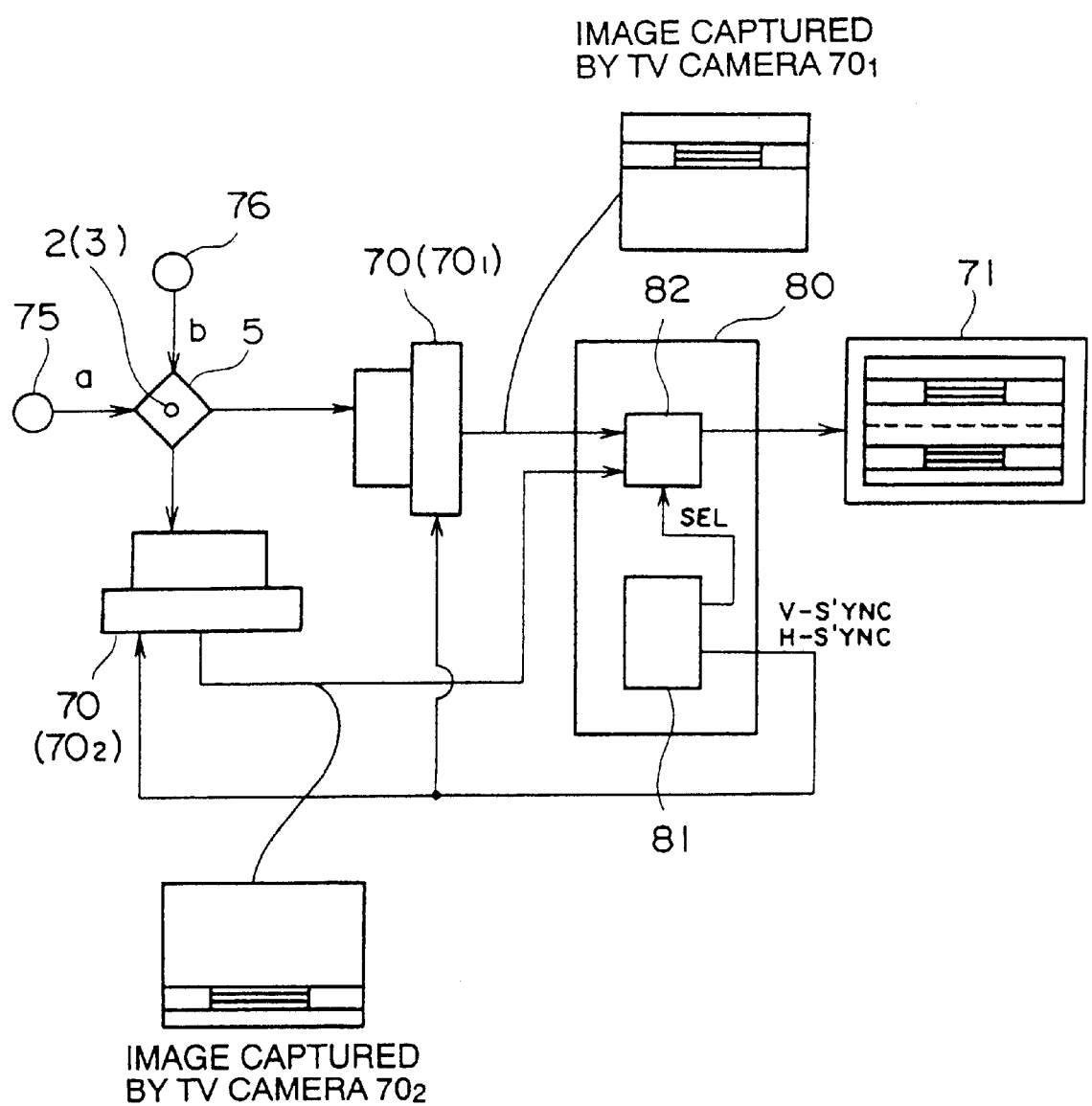
FIG. 16 is a diagram showing an example of a method of processing images captured by the two TV cameras shown in FIG. 15.

As shown in FIG. 15, the recoat grooves of the mold 5 and the connecting portion of the optical fiber set into the recoat grooves (not shown) can be captured by using two TV cameras 70 (70₁, 70₂). More specifically, as shown in FIG. 16, the first TV camera 70₁ is located in front of the mold 5, and the light source 75 is located at an opposite side (behind the mold 5) of the TV camera 70₁ with the mold 5 intervening between. With this structure, an image of light that has permeated through the interior of the mold 5 (the recoat grooves and the connecting portion 3 of the optical fiber 2 set into the recoat grooves) in the direction indicated by the arrow a in the figure can be captured by the first TV camera 70₁. Also, another light source 76 different from the light source 75 is provided in front of the mold 5, and the second TV camera 70₂ is located at an opposite side (the back side of the mold 5) of the light source 76 with the mold 5 intervening between. With this structure, an image of light that has permeated through the interior of the mold 5 (the recoat grooves and the connecting portion 3 of the optical fiber 2 set into the recoat grooves) in the direction indicated by the arrow b in the figure can be captured by the second TV camera 70₂. Those two TV cameras 70₁ and 70₂ are located such that the direction of scanning line is in parallel with the optical axis of the connecting portion 3 of the optical fiber 2 to be observed. The TV monitor 71 is located such that the direction of scanning line coincides with the direction of scanning line of the TV cameras 70₁, and 70₂.

The images (image signals) captured by those two TV cameras 70₁ and 70₂ are inputted to an image processing section 80 (FIG. 16) built in the device body 1 (FIG. 1). The image processing section 80 outputs the inputted image signals to the TV monitor 71 in synchronism with a vertical synchronous signal (V-S'YNC) generated from an internal synchronous signal generator 81. More specifically, the respective image signals outputted from those two TV cameras 70₁, and 70₂ are inputted to a video switch 82 of the image processing section 80. The video switch 82 changes over the respective parts of image signals inputted from the respective TV cameras 70₁, and 70₂ in accordance with an image change-over signal (SEL) generated by the synchronous signal generator 81 in synchronism with the vertical synchronous signal (V-S'YNC) in a period of ½ of one screen and synthesizes those image signals to output the synthesized image signal to the TV monitor 71.

Figure 17:
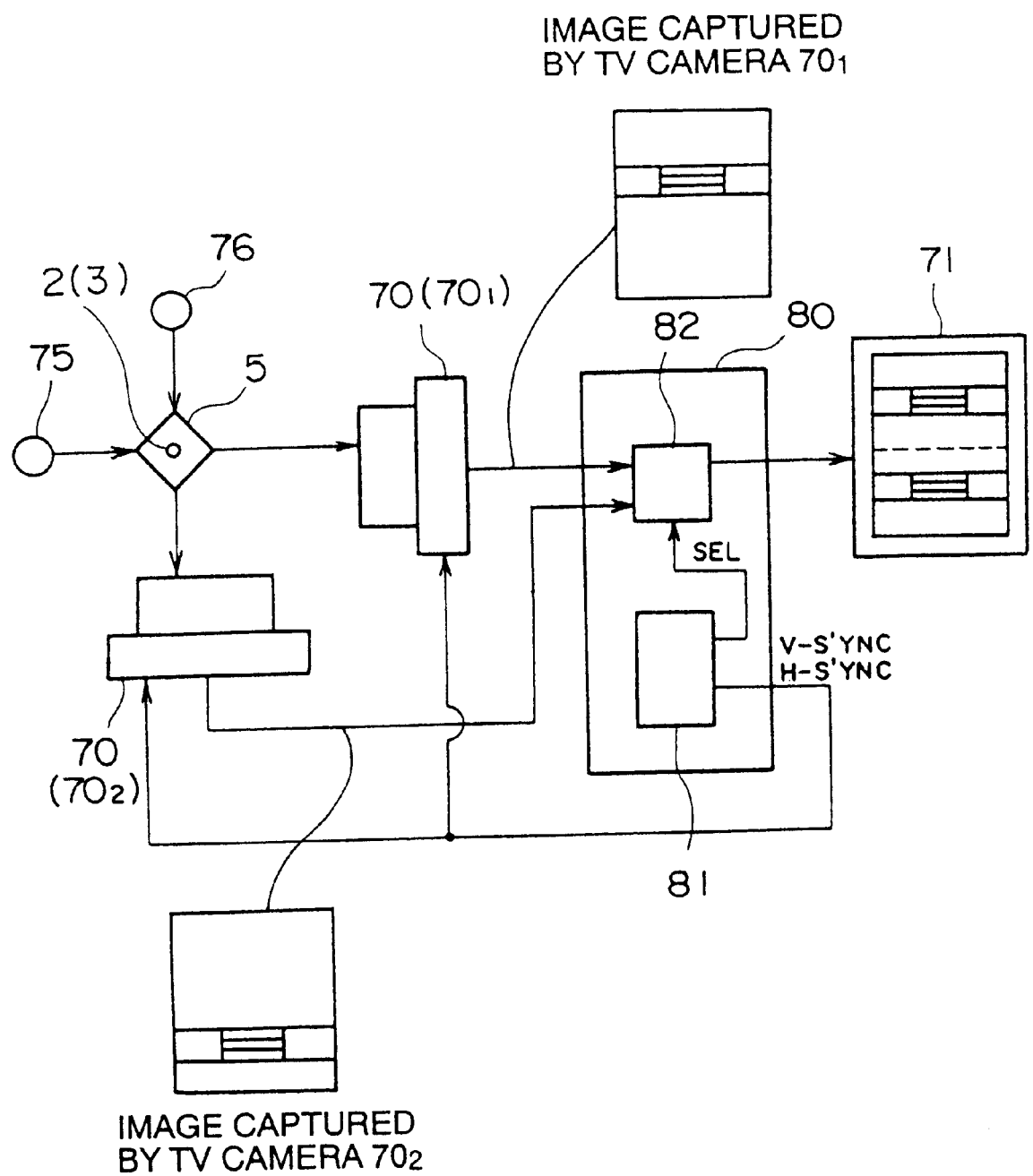
FIG. 17 is a diagram showing another example of a method of processing images captured by the two TV cameras shown in FIG. 15.

As shown in FIG. 17, the first and second TV cameras 70₁, and 70₂ and the TV camera 71 shown in FIG. 16 may be located such that the direction of scanning line is perpendicular to the axis of the connecting portion 3 of the optical fiber 2 to be observed. In this case, the image processing section 80 outputs the image signal to the TV monitor 71 in synchronism with the horizontal synchronous signal. More specifically, the respective image signals outputted from those two TV cameras 70₁, and 70₂ are inputted to the video switch 82 of the image processing section 80. The video switch 82 changes over the respective parts of image signals inputted from the respective TV cameras 70₁, and 70₂ in accordance with an image change-over signal (SEL) generated by the synchronous signal generator 81 in synchronism with the horizontal synchronous signal (H-S'YNC) in a period of ½ of one screen and synthesizes those image signals to output the synthesized image signal to the TV monitor 71.

As shown in FIGS. 16 or 17, in the case of using two TV cameras 70₁, and 70₂, what is displayed on one screen of the TV monitor 17 at the same time is a part of the photographing regions of the respective TV cameras 70₁ and 70₂. Therefore, the TV cameras 70₁ and 70₂ adjust the located position so that the recoat grooves of the mold 5 and the connecting portion 3 of the optical fiber 2 set into the recoat grooves to be observed enter a photographing region displayed on the TV monitor 71.

Figure 18:
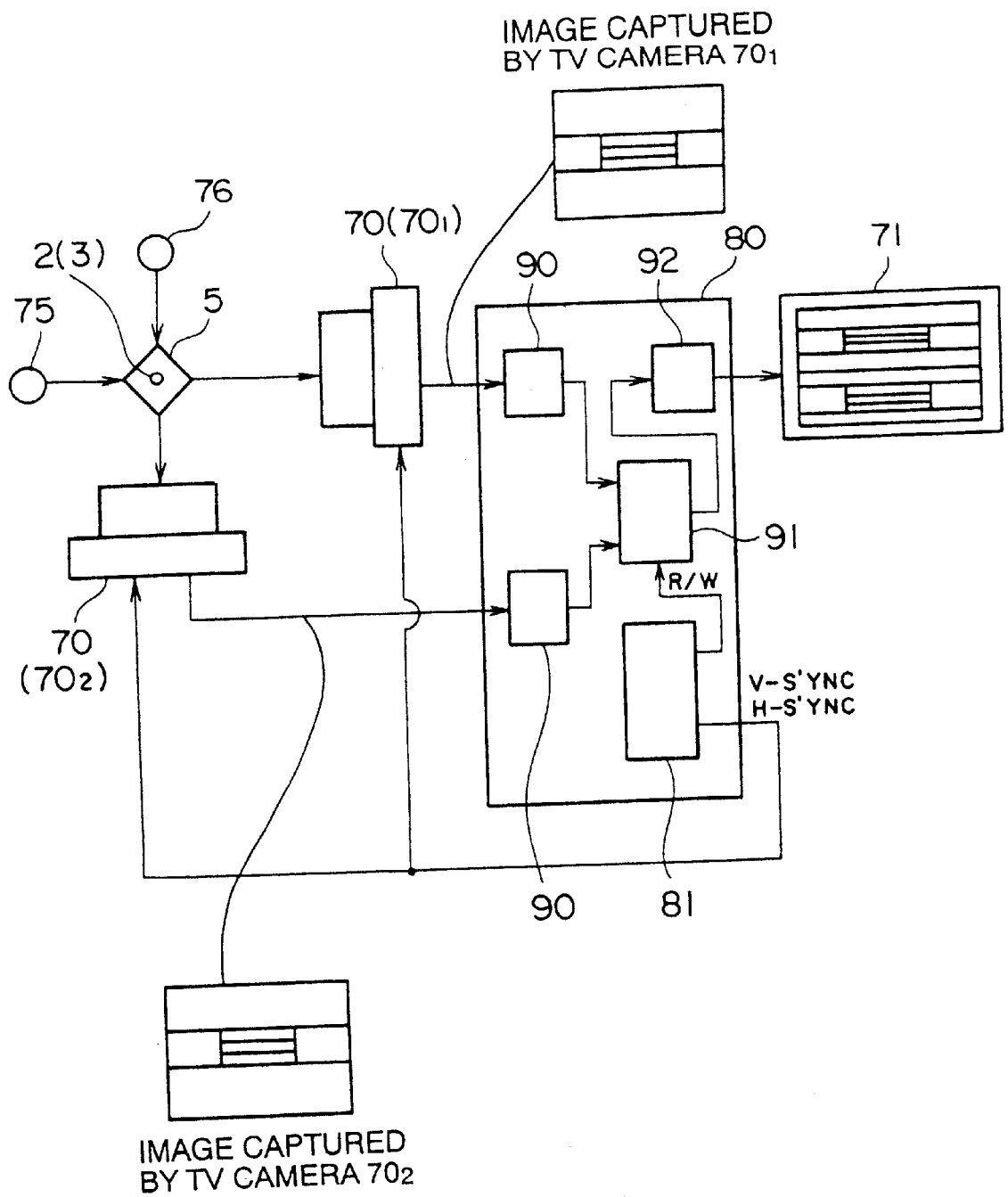
FIG. 18 is a diagram showing still another example of a method of processing images captured by the two TV cameras shown in FIG. 15.

An improvement in the observation precision can be conducted by using all of the photographing regions of those two TV cameras 70₁, and 70₂ shown in FIG. 16. More specifically, as shown in FIG. 18, the image signals outputted from the respective TV cameras 70₁, and 70₂ are inputted to the image processing section 80 and then converted into digital values by an internal A/D converter 90. Then, the digital values are written in a frame memory 91. Thereafter, the digital values are read from the frame memory 91 and converted into analog signals (image signals) by a D/A converter 92 and then outputted to the TV monitor 71. In this situation, when writing the digital values in the frame memory 91 or reading the digital values from the frame memory 91, a reducing and synthesizing process is conducted on the digital values so that the images captured by the two TV cameras $70_1$, and $70_2$ are displayed on one screen of the TV monitor 71.

Figure 19:
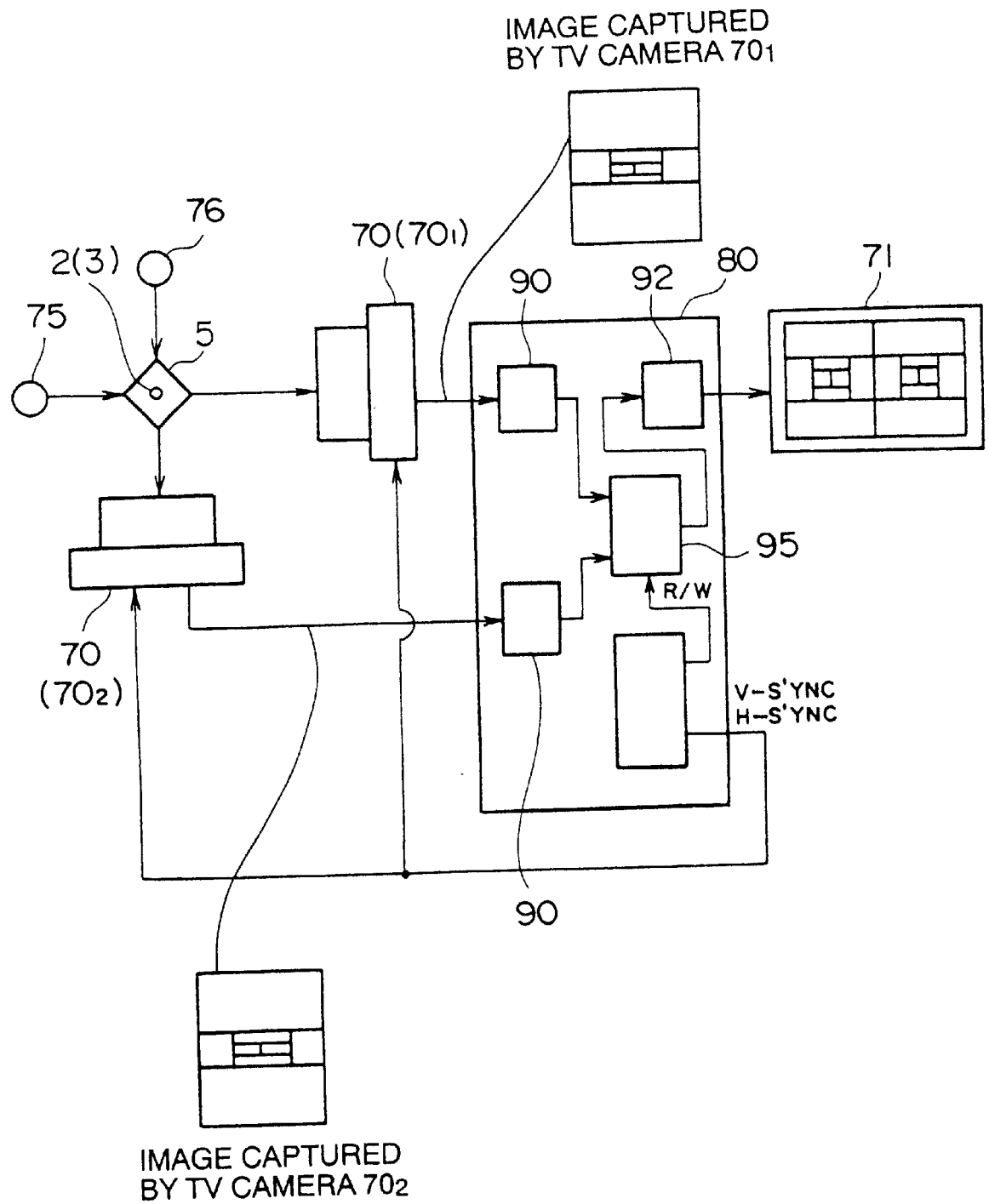
FIG. 19 is a diagram showing yet still another example of a method of processing images captured by the two TV cameras shown in FIG. 15.

An improvement in the observation precision can be conducted by using all of the photographing regions of those two TV cameras $70_1$ and 70 shown in FIG. 16. More specifically, as shown in FIG. 19, the image signals outputted from the respective TV cameras $70_1$, and $70_2$ are inputted to the image processing section 80 and then converted into digital values by an internal A/D converter 90. Then, the digital values are subjected to a scanning and converting process and a reducing and synthesizing process by a scanning converter 95. Thereafter, the digital values are converted into analog signals (image signals) by the D/A converter 92 and then outputted to the TV monitor 71. The scanning converter 95 includes a frame memory, and at the time of writing the digital values in the frame memory or at the time of reading the digital values from the frame memory, a longitudinal direction and a lateral direction of a write address or a read address are replaced by each other, to thereby produce an image resulting from rotating the photographing images of the respective TV cameras $70_1$, and $70_2$ at a 90°. Thereafter, the produced image is reduced, and the reduced image is synthesized into an image for one screen.

The above description was given of the present invention assuming that the light-curing resin used for recoating is a ultraviolet curing resin. However, the light-curing resin used for recoating is not limited to the ultraviolet curing resin. Therefore, in the case of using the light-curing resin which is cured by a light of a specific wavelength other than the ultraviolet ray for recoating, there are required a light source that generates the light having the specific wavelength, a cut filter that cuts off the specific wavelength. The optical fiber coating device having such light source and cut filter is also included in the present invention.

Industrial Availability

The optical fiber coating device according to the present invention has any one or more of the following effects (1) to (13).

(1) Since there is provided the observation window through which the interior of the mold can be confirmed in a state where the shielding lid remains closed, it is unnecessary to open and close the shielding lid every time the injection state of the light-curing resin or the curing state of the resin is confirmed, with the result that the operability is excellent.

(2) There is not possibility that the light-curing resin that exists at a location other than the recoat groove is exposed to the external light and cured by opening the shielding lid.

(3) Since there is provided the open/close lid that can open and close the observation window, the observation window is opened only when the interior of the mold needs to be confirmed, and in other situations, the observation window is closed, thereby being capable of preventing the entrance of the external light. Therefore, the possibility that the light-curing resin that exists at a location other than the recoat grooves is exposed to the external light is still more lessened.

(4) Since the optical shielding guard plate is provided around the observation window, the same effect as that of the above effect (3) can be obtained even if the open/close lid is not provided. Therefore, a troublesomeness that the open/close lid is operated is omitted, and the structure of the device is simplified. As a result, the production costs are reduced, and the durability is also improved.

(5) Since there is provided the photo sensor that can detect the amount of light of the light source, the amount of light of the light source can be adjusted on the basis of the detected result of the photo sensor. Also, the degree of the deterioration of the light source can be estimated on the basis of the detected result of the photo sensor.

(6) Since the amount of light of the light source can be automatically adjusted on the basis of the detected result of the photo sensor, even if an operator does not confirm or adjust the amount of light, a light of necessary and sufficient level is always irradiated onto the light-curing resin.

(7) Since the deterioration of the light source is judged on the basis of the detected result of the photo sensor, and the deterioration of the light source can be alarmed, the light source can be exchanged timely. Therefore, such an inconvenience that the curing of the light-curing resin becomes insufficient because of the continuous use of the deteriorated light source is surely avoided.

(8) Since the filter that cuts a light having a light-curing resin curing band is provided on the observation window through which the interior of the mold can be confirmed in a state where the shielding lid is closed, there is not possibility that the light-curing resin is cured with the external light that has entered into the shielding lid.

(9) The TV camera that can capture the interior of the mold is provided inside of the shielding lid, and the TV monitor that can output the photographing image of the TV camera is provided outside of the shielding lid. Accordingly, the interior of the mold can be observed by the TV monitor without opening the shielding lid. With the use of the TV camera having a zoom-up function, the interior of the mold (in detail, the recoat grooves, and the coating removed portion of the optical fiber set into the recoat grooves) can be enlarged and displayed on the TV monitor.

(10) There are provided the observation window having the filter that cuts off the light of the light-curing resin curing band and both of the TV camera and the TV monitor. Therefore, the interior of the mold can be directly observed and observed through the TV monitor. Also, in any cases, there is not possibility that the light-curing resin is cured with the external light.

(11) There is provided the illumination light source that illuminates the mold with the light not including a light-curing resin curing band component. Therefore, the mold is illuminated to facilitate the observation, and there is not possibility that the ultraviolet curing resin is unnecessarily cured.

(12) A lens is provided on both or one of the inside and the outside of the observation window. Therefore, the interior of the mold can be enlarged and observed with a simple structure and at the low costs as compared with a case of using the TV camera having a zoom-up function.

(13) There is provided a window that projects portions which cannot be directly observed from the observation windows or cannot be directly captured by the TV camera. Therefore, those portions can be observed or captured. That is, the interior of the mold can be observed or captured from two different directions.

The foregoing description of the preferred embodiments of the invention has been presented for purposes of illustration and description. It is not intended to be exhaustive or to limit the invention to the precise form disclosed, and modifications and variations are possible in light of the above teachings or maybe acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed.

2. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an open/close lid that can open/close the observation window.

3. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed, and an optical shielding guard plate is provided around the observation window.

4. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an open/close lid that can open/close the observation window, and an optical shielding guard plate is provided around the observation window.

5. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and a photo sensor that can detect the quantity of light of the light source.

6. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, an open/close lid that can open/close the observation window, and a photo sensor that can detect the quantity of light of the light source.

7. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and a photo sensor that can detect the quantity of light of the light source, and an optical shielding guard plate is provided around the observation window.

8. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, an open/close lid that can open/close the observation window, and a photo sensor that can detect the quantity of light of the light source, and an optical shielding guard plate is provided around the observation window.

9. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and a photo sensor that can detect the quantity of light of the light source, and the quantity of light of the light source is automatically adjusted on the basis of the detected result of the photo sensor.

10. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, an open/close lid that can open/close the observation window, and a photo sensor that can detect the quantity of light of the light source, and the quantity of light of the light source is automatically adjusted on the basis of the detected result of the photo sensor.

11. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and a photo sensor that can detect the quantity of light of the light source, an optical shielding guard plate is provided around the observation window, and the quantity of light of the light source is automatically adjusted on the basis of the detected result of the photo sensor.

12. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, an open/close lid that can open/close the observation window, and a photo sensor that can detect the quantity of light of the light source, an optical shielding guard plate is provided around the observation window, and the quantity of light of the light source is automatically adjusted on the basis of the detected result of the photo sensor.

13. The optical fiber coating device as claimed in any one of claims 5 to 12, wherein it is judged whether the light source is deteriorated or not, on the basis of the detected result of the photo sensor, and the deterioration of the light source can be warned.

14. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed, and a filter that cuts off a light of a light-curing resin curing band is provided on the observation window.

15. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein a TV camera that can capture the interior of the mold is provided inside of the shielding lid, and a TV monitor that can display an image captured by the TV camera is provided outside of the shielding lid.

16. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed, a filter that cuts off a light of a light-curing resin curing band is provided on the observation window, a TV camera that can capture the interior of the mold is provided inside of the shielding lid, and a TV monitor that can display an image captured by the TV camera is provided outside of the shielding lid.

17. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an illumination light source that illuminates the mold with a light not including a curing band component of the light-curing resin, and a filter that cuts off a light of a light-curing resin curing band is provided on the observation window.

18. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an illumination light source that illuminates the mold with a light not including a curing band component of the light-curing resin, a TV camera that can capture the interior of the mold is provided inside of the shielding lid, and a TV monitor that can display an image captured by the TV camera is provided outside of the shielding lid.

19. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an illumination light source that illuminates the mold with a light not including a curing band component of the light-curing resin, a filter that cuts off a light of a light-curing resin curing band is provided on the observation window, a TV camera that can capture the interior of the mold is provided inside of the shielding lid, and a TV monitor that can display an image captured by the TV camera is provided outside of the shielding lid.

20. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed, a filter that cuts off a light of a light-curing resin curing band is provided on the observation window, and a lens that enables the interior of the mold to be enlarged and observed is provided on both or one of the inside and the outside of the observation window.

21. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there is provided an observation window through which the interior of the mold can be observed in a state where the shielding lid is closed, a filter that cuts off a light of a light-curing resin curing band is provided on the observation window, a lens that enables the interior of the mold to be enlarged and observed is provided on both or one of the inside and the outside of the observation window, a TV camera that can capture the interior of the mold is provided inside of the shielding lid, and a TV monitor that can display an image captured by the TV camera is provided outside of the shielding lid.

22. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an illumination light source that illuminates the mold with a light not including a curing band component of the light-curing resin, a filter that cuts off a light of a light-curing resin curing band is provided on the observation window, and a lens that enables the interior of the mold to be enlarged and observed is provided on both or one of the inside and the outside of the observation window.

23. An optical fiber coating device in which a coating removed portion of an optical fiber is set in a slender groove of a mold within a device body, a light-curing resin is injected into the slender groove, a light is irradiated onto the light-curing resin from a light source provided inside of a shielding lid which is fitted onto the device body in an openable and closable fashion to cure the light-curing resin, thereby recoating the coating removed portion, wherein there are provided an observation window through which the interior of the mold can be observed in a state where the shielding lid is closed, and an illumination light source that illuminates the mold with a light not including a curing band component of the light-curing resin, a filter that cuts off a light of a light-curing resin curing band is provided on the observation window, a lens that enables the interior of the mold to be enlarged and observed is provided on both or one of the inside and the outside of the observation window, a TV camera that can capture the interior of the mold is provided inside of the shielding lid, and a TV monitor that can display an image captured by the TV camera is provided outside of the shielding lid.

24. The optical fiber coating device as claimed in any one of claims 14 to 23, wherein there is further provided a mirror that projects a portion of the interior of the mold which cannot be directly observed from the observation window or a portion of the interior of the mold which cannot be directly captured by the TV camera.

* * * * *